United States Patent
Takashi et al.

(10) Patent No.: US 12,444,792 B2
(45) Date of Patent: Oct. 14, 2025

(54) NONAQUEOUS ELECTROLYTE RECHARGEABLE BATTERY AND METHOD FOR MANUFACTURING NONAQUEOUS ELECTROLYTE RECHARGEABLE BATTERY

(71) Applicants: PRIMEARTH EV ENERGY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Yusuke Takashi, Toyohashi (JP); Takaaki Izumoto, Toyohashi (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 554 days.

(21) Appl. No.: 17/942,049

(22) Filed: Sep. 9, 2022

(65) Prior Publication Data
US 2023/0079617 A1 Mar. 16, 2023

(30) Foreign Application Priority Data
Sep. 13, 2021 (JP) .................................. 2021-148901

(51) Int. Cl.
*H01M 50/131* (2021.01)
*H01M 10/04* (2006.01)
(Continued)

(52) U.S. Cl.
CPC ..... *H01M 50/131* (2021.01); *H01M 10/0468* (2013.01); *H01M 10/049* (2013.01);
(Continued)

(58) Field of Classification Search
CPC .................................................. H01M 50/131
See application file for complete search history.

(56) References Cited

U.S. PATENT DOCUMENTS

| 10,680,215 B2 | 6/2020 | Morita et al. |
| 2004/0142246 A1* | 7/2004 | Han .................. H01M 10/0567 429/324 |

FOREIGN PATENT DOCUMENTS

| JP | 2014-116180 A | 6/2014 |
| JP | 2017-111940 A | 6/2017 |

(Continued)

OTHER PUBLICATIONS

JP Office Action dated Aug. 1, 2023 as received in Application No. 2021-148901.

*Primary Examiner* — Brian R Ohara
(74) *Attorney, Agent, or Firm* — Maschoff Brennan

(57) ABSTRACT

A nonaqueous electrolyte rechargeable battery includes an electrode body, a nonaqueous electrolyte, and a rectangular box-shaped battery case accommodating the electrode body and the nonaqueous electrolyte. The electrode body includes a positive electrode including a positive base and a positive composite material layer, a negative electrode including a negative base and a negative composite material layer, and a porous resin separator disposed therebetween. The electrode body has a low profile when the positive electrode, the negative electrode, and the separator are laminated and rolled. When spring constant of the nonaqueous electrolyte rechargeable battery with a load of 316 to 210 N/cm² and 95 to 74 N/cm² is respectively referred to as spring constant H and spring constant L, the ratio L/H is 0.34 or greater and 0.41 or less. A resistance increase rate between before and after a square wave test is less than or equal to 1.17.

2 Claims, 6 Drawing Sheets

| Process | | Spring Constant H | Spring Constant L | L/H | Resistance Increase Rate |
|---|---|---|---|---|---|
| A | Example 1 | 207 | 71 | 0.34 | 1.17 |
| A | Example 2 | 239 | 82 | 0.34 | 1.17 |
| A | Example 3 | 164 | 58 | 0.35 | 1.15 |
| A | Example 4 | 228 | 81 | 0.35 | 1.09 |
| A | Example 5 | 164 | 58 | 0.35 | 1.12 |
| A | Example 6 | 187 | 68 | 0.36 | 1.11 |
| A | Example 7 | 226 | 90 | 0.40 | 1.10 |
| A | Example 8 | 215 | 87 | 0.41 | 1.15 |
| B | Comparative Example 1 | 183 | 58 | 0.32 | 1.24 |
| C | Comparative Example 2 | 238 | 102 | 0.43 | 1.21 |

(51) Int. Cl.
  *H01M 10/0525* (2010.01)
  *H01M 10/0587* (2010.01)
  *H01M 10/44* (2006.01)
  *H01M 50/103* (2021.01)
  *H01M 50/414* (2021.01)
  *H01M 50/46* (2021.01)
  *H01M 50/466* (2021.01)
  *H01M 50/491* (2021.01)

(52) U.S. Cl.
  CPC ..... *H01M 10/0587* (2013.01); *H01M 10/446* (2013.01); *H01M 50/103* (2021.01); *H01M 50/414* (2021.01); *H01M 50/46* (2021.01); *H01M 50/466* (2021.01); *H01M 50/491* (2021.01); *H01M 10/0525* (2013.01); *H01M 2220/20* (2013.01)

(56) References Cited

FOREIGN PATENT DOCUMENTS

| | | |
|---|---|---|
| JP | 2018106981 A | 7/2018 |
| JP | 2019-029411 A | 2/2019 |
| JP | 2020-092049 A | 6/2020 |
| WO | 2012/111077 A1 | 8/2012 |

\* cited by examiner

Fig.7

| Step | Examples 1 to 8 Process A | Comparative Example 1 Process B | Comparative Example 2 Process C |
|---|---|---|---|
| Rolled Body Pressing Step | Temperature: 25°C Restraining ≤ 100 kN | ← | ← |
| Cell Drying Step | Temperature: 105°C No Restraining | ← | ← |
| Initial Charging Step | Temperature: 25°C Restraining ≤ 10 kN | ← | ← |
| Aging Step | Temperature: 60°C or higher No Restraining | ← | Temperature: 60°C or higher Restraining |
| Self-Discharge Inspection Step | Temperature: 20°C Restraining ≤ 10 kN | Temperature: 20°C No Restraining | ← |
| Shipping Inspection Step | Temperature: 20°C Restraining ≤ 10 kN | Temperature: 20°C No Restraining | ← |

Fig.8
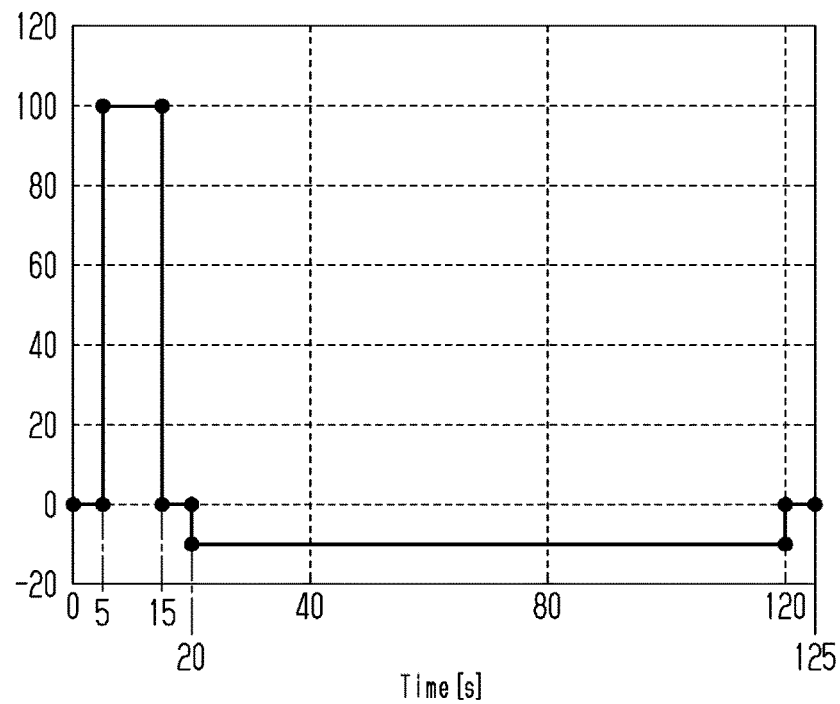

| Process | | Spring Constant H | Spring Constant L | L/H | Resistance Increase Rate |
|---|---|---|---|---|---|
| A | Example 1 | 207 | 71 | 0.34 | 1.17 |
| | Example 2 | 239 | 82 | 0.34 | 1.17 |
| | Example 3 | 164 | 58 | 0.35 | 1.15 |
| | Example 4 | 228 | 81 | 0.35 | 1.09 |
| | Example 5 | 164 | 58 | 0.35 | 1.12 |
| | Example 6 | 187 | 68 | 0.36 | 1.11 |
| | Example 7 | 226 | 90 | 0.40 | 1.10 |
| | Example 8 | 215 | 87 | 0.41 | 1.15 |
| B | Comparative Example 1 | 183 | 58 | 0.32 | 1.24 |
| C | Comparative Example 2 | 238 | 102 | 0.43 | 1.21 |

NONAQUEOUS ELECTROLYTE RECHARGEABLE BATTERY AND METHOD FOR MANUFACTURING NONAQUEOUS ELECTROLYTE RECHARGEABLE BATTERY

BACKGROUND

1. Field

The following description relates to a nonaqueous electrolyte rechargeable battery and a method for manufacturing a nonaqueous electrolyte rechargeable battery, and more specifically, a nonaqueous electrolyte rechargeable battery and a method for manufacturing a nonaqueous electrolyte rechargeable battery that limit high-rate deterioration.

2. Description of Related Art

A nonaqueous electrolyte rechargeable battery such as a lithium-ion rechargeable battery has been recently used as a power supply of an electric vehicle and the like. Hence, the lithium-ion rechargeable battery includes a number of cell batteries connected in series or in parallel to supply a high voltage or a high current. Rolled-type batteries, in which electrode sheets are rolled, are used so that a number of cell batteries is loaded. Further, a cell battery having a low-profile rolled electrode body is often used to reduce the battery size and increase the cooling efficiency.

In the low-profile rolled electrode body, active material layers bulge and contract in accordance with charging and discharging. The pressure of the electrode body increases and decreases, accordingly. This may cause distribution (unevenness) of concentration of supporting salt and leakage of the nonaqueous electrolyte to the outside of the electrode body, which may result in the depletion of the electrolyte. Consequently, the internal resistance of the rechargeable battery may increase. In particular, when a rechargeable battery is used in a mode that repeats charging and discharging at a high rate, the rechargeable battery may be subject to quick high-rate deterioration.

In this regard, for example, Japanese Laid-Open Patent Publication No. 2018-106981 discloses an invention that increases the spring constant of an outer roll portion from the spring constant of an inner roll portion to restrict the bulging of the electrode body, thereby limiting high-rate deterioration. In a central region of the negative electrode in which the nonaqueous electrolyte tends to move, the spring constant of the outer roll portion is set to be greater than the spring constant of the inner roll portion. As a result, the outer roll portion is hardened and becomes more resistant to contraction. Changes in the thickness of the outer roll portion are limited during charging and discharging. As a result, the nonaqueous electrolyte is less likely to be forced out from the roll end portion of the rolled electrode body in a preferred manner.

However, in the invention disclosed in Japanese Laid-Open Patent Publication No. 2018-106981, in order to change the spring constants of the inner part and the outer part of the roll, the composition of electrodes and the density of composite materials need to be changed in a longitudinal direction of the electrode body. As a result, the electrode body is complicated. Also, the manufacturing process is complicated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a nonaqueous electrolyte rechargeable battery that includes an electrode body, a nonaqueous electrolyte, and a rectangular box-shaped battery case accommodating the electrode body and the nonaqueous electrolyte. The electrode body includes a positive electrode including a positive base and a positive composite material layer, a negative electrode including a negative base and a negative composite material layer, and a porous resin separator disposed between the positive electrode and the negative electrode. The electrode body has a low profile when the positive electrode, the negative electrode, and the separator are laminated and rolled. When a spring constant of the nonaqueous electrolyte rechargeable battery with a load of 316 to 210 N/cm$^2$ is referred to as a spring constant H and a spring constant of the nonaqueous electrolyte rechargeable battery with a load of 95 to 74 N/cm$^2$ is referred to as a spring constant L, a ratio L/H of the spring constant L to the spring constant H is greater than or equal to 0.34 and less than or equal to 0.41.

The nonaqueous electrolyte rechargeable battery may be a lithium-ion rechargeable battery.

Another aspect of the present disclosure is a method for manufacturing a nonaqueous electrolyte rechargeable battery that includes an electrode body, a nonaqueous electrolyte, and a rectangular box-shaped battery case accommodating the electrode body and the nonaqueous electrolyte. The method includes restraining the electrode body by directly or indirectly applying pressure to the electrode body in a thickness-wise direction only when the nonaqueous electrolyte rechargeable battery is at a normal temperature of 10° C. to 35° C.

In the method described above, the electrode body includes a positive electrode including a positive base and a positive composite material layer, a negative electrode including a negative base and a negative composite material layer, and a porous resin separator disposed between the positive electrode and the negative electrode. The method further includes rolling a lamination of the positive electrode, the negative electrode, and the separator of the electrode body, pressing the rolled electrode body to have a low profile, drying the electrode body in the battery case, initially charging, aging, and inspecting. The restraining may be performed in at least one of the initially charging and the inspecting, whereas the restraining is not performed in the drying and the aging.

In the method described above, when a spring constant of the nonaqueous electrolyte rechargeable battery with a load of 316 to 210 N/cm$^2$ is referred to as a spring constant H and a spring constant of the nonaqueous electrolyte rechargeable battery with a load of 95 to 74 N/cm$^2$ is referred to as a spring constant L, a condition of the restraining is set so that a ratio L/H of the spring constant L to the spring constant H equals a predetermined set value.

In the method described above, the condition of the restraining may be set so that the ratio L/H is greater than or equal to 0.34 and less than or equal to 0.41.

In the method described above, in the restraining, the pressure may be applied with a load of 210 N/cm$^2$ or less.

In the method described above, the nonaqueous electrolyte rechargeable battery may be a lithium-ion rechargeable battery.

Other features and aspects will be apparent from the following detailed description, the drawings, and the claims.

BRIEF DESCRIPTION OF THE DRAWINGS

FIG. 7 is a table showing test conditions of examples in the present embodiment and comparative examples.

FIG. 8 is a graph showing a square wave test for testing high-rate deterioration of the lithium-ion rechargeable battery of the present embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
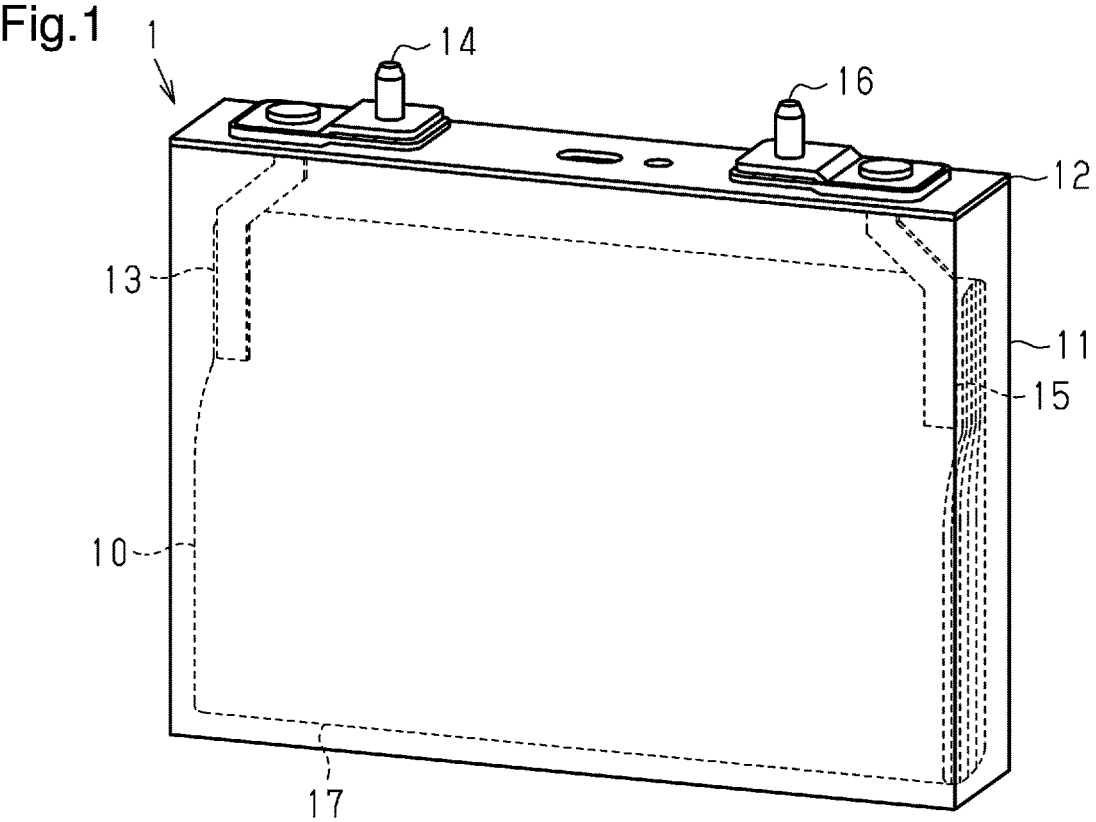
FIG. 1 is a perspective view showing a lithium-ion rechargeable battery of the present embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A nonaqueous electrolyte rechargeable battery and a method for manufacturing a nonaqueous electrolyte rechargeable battery according to the present disclosure will now be described based on embodiments of a lithium-ion rechargeable battery 1 and a method for manufacturing the lithium-ion rechargeable battery 1 with reference to FIGS. 1 to 10.

Configuration of First Embodiment

Principle of Present Embodiment

The lithium-ion rechargeable battery 1 and the method for manufacturing the lithium-ion rechargeable battery 1 according to the present embodiment limit deterioration even when used in a mode that repeats charging and discharging at a high rate without complicating an electrode body 10.

When the electrode body 10 is of a low-profile rolled type and repeats charging and discharging at a high rate, active material layers bulge and contract in accordance with the charging and discharging. The pressure of the electrode body 10 increases and decreases, accordingly. This may cause distribution (unevenness) of concentration of supporting salt and leakage of a nonaqueous electrolyte 17 to the outside of the electrode body 10, which may result in the depletion of the electrolyte. Consequently, the internal resistance of the lithium-ion rechargeable battery 1 may increase. Resultant deterioration in the properties of the lithium-ion rechargeable battery 1 is referred to as high-rate deterioration.

To limit the high-rate deterioration, the lithium-ion rechargeable battery 1 and the method for manufacturing the lithium-ion rechargeable battery 1 according to the present embodiment limit the distribution (unevenness) of concentration of supporting salt and the leakage of the nonaqueous electrolyte to the outside of the electrode body 10, which may result in the depletion of the electrolyte. To limit the high-rate deterioration, increases and decreases in the pressure of the electrode body 10 are limited.

More specifically, the electrode body 10 is bulged when a high load is applied at a high state of charge (SOC). In this state, the electrode body 10 is softened to absorb changes in the volume, thereby avoiding the discharging of the electrolyte when bulged. Thus, the electrolyte maintains a high retainability when the SOC is high.

When a low load is applied at a low SOC, the electrode body 10 is contracted. In this state, the electrode body 10 is hardened to limit changes in the volume, thereby avoiding the discharging of the electrolyte when contracted. Thus, the electrolyte also maintains a high retainability when the SOC is low.

When a lithium-ion rechargeable battery has both of the properties described above, the high-rate deterioration is limited.

The inventors of the present disclosure obtained the hardness of the electrode body 10 when the electrode body 10 is bulged and when the electrode body 10 is contracted. The spring constant of the lithium-ion rechargeable battery with 316 to 210 N/cm$^2$ is referred to as spring constant H. The spring constant of the lithium-ion rechargeable battery with 95 to 74 N/cm$^2$ is referred to as spring constant L. In an example, the spring constant H is a spring constant of the lithium-ion rechargeable battery when a load of 316 to 210 N/cm$^2$ is applied to the lithium-ion rechargeable battery in a thickness-wise direction D, and the spring constant L is a spring constant of the lithium-ion rechargeable battery when a load of 95 to 74 N/cm$^2$ is applied to the lithium-ion rechargeable battery in the thickness-wise direction D. When the lithium-ion rechargeable battery is assembled and the spring constant H and the spring constant L are measured, the hardness of the electrode body 10 is indirectly measured via a battery case 11. The inventors have found through experiments that when a ratio L/H of the spring constant L to the spring constant H is greater than or equal to 0.34 and less than or equal to 0.41, the ratio has a good balance and the high-rate deterioration is limited.

To obtaining such a ratio L/H, the inventors also have found that the spring constant L with a low load is uniquely increased when the electrode body 10 is directly or indirectly restrained only in a normal-temperature process, that is, the electrode body 10 is directly or indirectly restrained in a normal-temperature process, whereas the electrode body 10 is not restrained in a low-temperature process and a high-temperature process. The inventors have found, using this property, a manufacturing method that sets the ratio L/H of the spring constant L to the spring constant H to be greater than or equal to 0.34 and less than or equal to 0.41. In a method for manufacturing a nonaqueous electrolyte rechargeable battery 1 that includes the electrode body 10, the nonaqueous electrolyte 17, and a rectangular box-shaped battery case 11 accommodating the electrode body 10 and the nonaqueous electrolyte 17, pressure is directly or indirectly applied to the electrode body 10 in a thickness-wise direction under a predetermined condition only in a normal-temperature manufacturing step (normal-temperature process) in which the temperature of the nonaqueous electrolyte rechargeable battery 1 is 10° C. to 35° C. among multiple manufacturing steps. In other words, the electrode body 10 is not restrained directly or indirectly in the thickness-wise direction in a low-temperature process and a high-temperature process that are included in the multiple manufacturing steps.

Structure of Lithium-Ion Rechargeable Battery 1

The structure of the lithium-ion rechargeable battery 1 described in the present embodiment will now be briefly described.

FIG. 1 is a perspective view of the lithium-ion rechargeable battery 1. As shown in FIG. 1, the lithium-ion rechargeable battery 1 includes a cell battery. The lithium-ion rechargeable battery 1 includes a rectangular-box-shaped battery case 11 having an upper opening. The battery case 11 includes a lid 12 configured to seal the battery case 11. The electrode body 10 is accommodated in the battery case 11. The nonaqueous electrolyte 17 is added into the battery case 11 from a liquid inlet, which is not shown in the drawings. The battery case 11 and the lid 12 are formed from metal such as an aluminum alloy. The lithium-ion rechargeable battery 1 includes a hermetic battery container that is formed when the lid 12 is attached to the battery case 11. The lithium-ion rechargeable battery 1 further includes a negative external terminal 14 and a positive external terminal 16 that are disposed on the lid 12 and used when charging and discharging power.

Electrode Body 10

Figure 2:
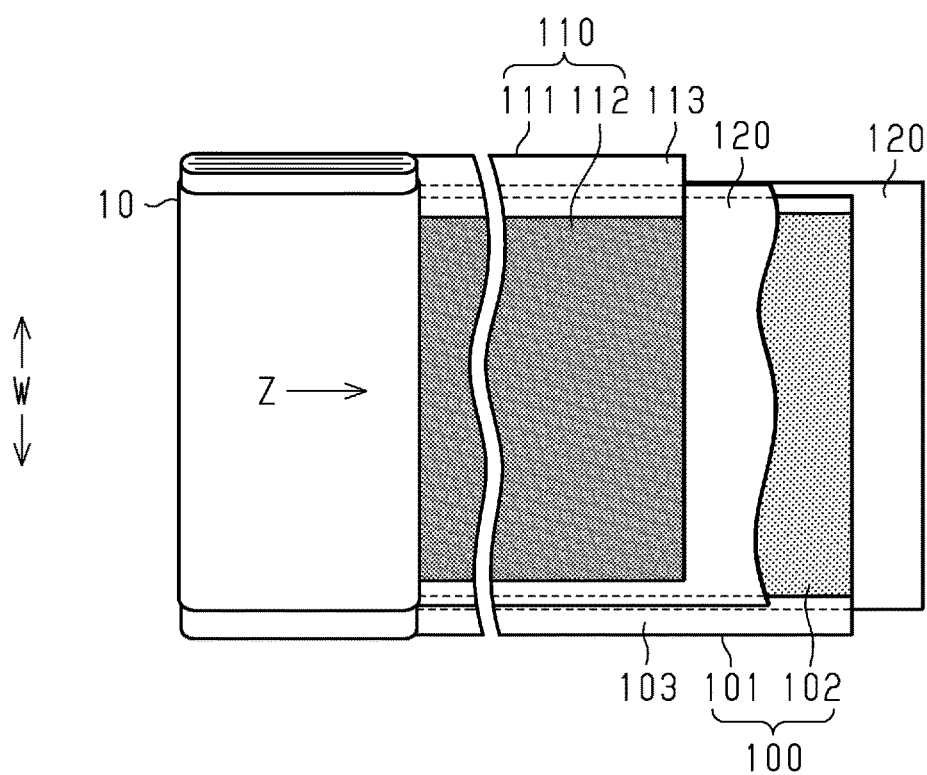
FIG. 2 is a schematic diagram showing the structure of a lamination of an electrode body of the lithium-ion rechargeable battery.

FIG. 2 is a schematic diagram showing the structure of a lamination of the electrode body 10 of the lithium-ion rechargeable battery 1. As shown in FIG. 2, the electrode body 10 of the lithium-ion rechargeable battery 1 includes a negative electrode sheet 100, a positive electrode sheet 110, and a separator 120. The negative electrode sheet 100 includes a negative base 101 and negative composite material layers 102 disposed on opposite ends of the negative base 101. The positive electrode sheet 110 includes a positive base 111 and positive composite material layers 112 disposed on opposite ends of the positive base 111. The negative electrode sheet 100 and the positive electrode sheet 110 are disposed on opposite sides of the separator 120 to form a lamination. The lamination is rolled about a roll axis in a longitudinal direction Z and then is shaped to have a low profile. This forms the electrode body 10.

A negative connector 103 is used as a current collector that draws out electricity from the negative composite material layers 102 of the negative electrode sheet 100. A positive connector 113 is used as a current collector that draws out electricity from the positive composite material layers 112 of the positive electrode sheet 110.

End Structure of Electrode Body 10

Figure 3:
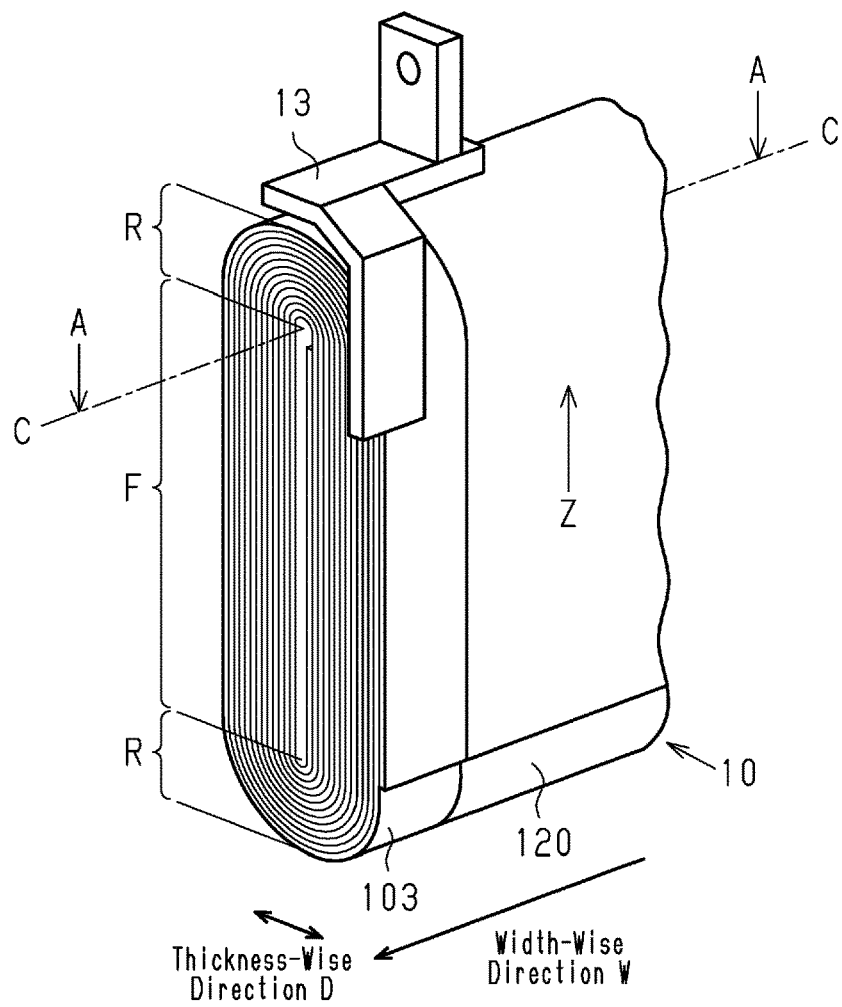
FIG. 3 is a schematic diagram showing the structure of the lamination of the electrode body of the lithium-ion rechargeable battery.

FIG. 3 is a perspective view of the negative electrode end of the rolled electrode body 10 in the width-wise direction. When portions of the electrode body 10 located on centers C-C are supported, the electrode body 10 is rolled about a roll axis (FIG. 5: S3). In a rolled body pressing step (FIG. 5: S4), the electrode body 10 is pressed by two pressing units 2 (refer to FIG. 4) from the thickness-wise direction D that is orthogonal to a width-wise direction W so that as viewed in the width-wise direction W, the end has a low profile, for example, the form of an athletic track. As shown in FIG. 1, the low-profile electrode body 10 is accommodated in the battery case 11, and a negative current collector 13 is welded to the negative connector 103. Also, a positive current collector 15 is welded to the positive connector 113. Examples of the method for welding a current collector to a connector include ultrasonic welding, resistance welding, and electric welding. The negative external terminal 14 is connected to the negative current collector 13 through the lid 12. The positive external terminal 16 is connected to the positive current collector 15 through the lid 12.

In this description, the width-wise direction W refers to a direction parallel to the roll axis of the electrode body 10. The thickness-wise direction D refers to a direction that is orthogonal to the roll axis of the electrode body 10 and a surface of a flat portion F. Also, a longitudinal direction Z refers to a direction that is orthogonal to the width-wise direction W and the thickness-wise direction D.

Flat Portion F and Bent Portion R

Figure 4:
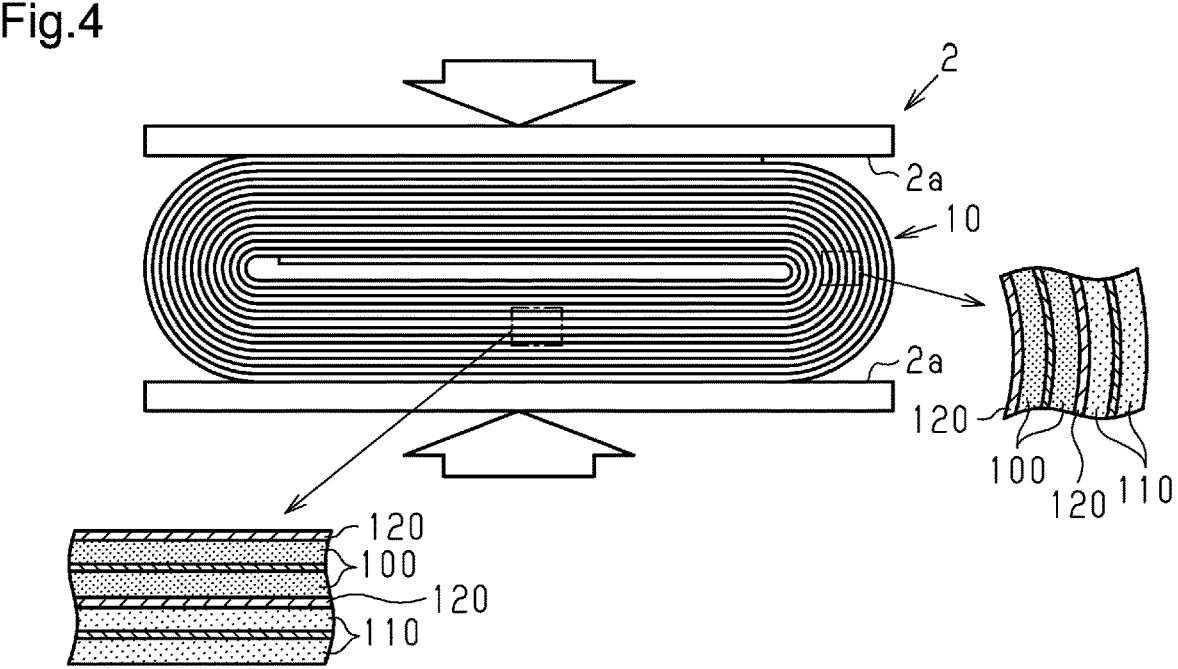
FIG. 4 is a schematic diagram showing the structure of an end of the electrode body as viewed in a width-wise direction W.

FIG. 4 is a schematic diagram showing the structure of an end of the electrode body 10 as viewed in the width-wise direction W. The electrode body 10, which is pressed and has a low profile, includes a linear center portion defining the flat portion F that is planar and formed of the negative electrode sheet 100, the positive electrode sheet 110, and the separator 120.

At an upper end and a lower end of the flat portion F, the electrode body 10, which is formed by laminating the negative electrode sheet 100, the positive electrode sheet 110, and the separator 120, is bent into the form of a semicircular rod to form a bent portion R.

The bent portions R have the form of semicircles that are substantially concentric as viewed in the width-wise direction W. The negative electrode sheet 100, the positive electrode sheet 110, and the separator 120 that are laminated in the bent portions R are semicircular and substantially concentric as viewed in the width-wise direction W. The position of the center of each semicircle is referred to as a center C. The center C may be considered as a straight line extending in the width-wise direction W. Also, the center C may be considered as a midpoint between borderlines of the flat portion F and each bent portion R in the longitudinal direction L.

Negative Electrode Sheet 100

The negative composite material layers 102 are formed on opposite surfaces of the negative base 101 to obtain the negative electrode sheet 100. In the embodiment, the negative base 101 is formed of a copper foil. The negative base 101 is a base for aggregating the negative composite material layers 102 and is also a current collecting member that collects electricity from the negative composite material layers 102. The negative electrode sheet 100 is obtained by forming the negative composite material layers 102 on the metal negative base 101. In the first embodiment, the negative active material is a material capable of storing and releasing lithium ions and is powder of a carbon material such as graphite.

The negative electrode sheet 100 is formed by, for example, mixing the negative active material, solvent, and binder, applying the mixed negative composite material to the negative base 101, and drying the negative composite material.

Positive Electrode Sheet 110

The positive composite material layers 112 are formed on opposite surfaces of the positive base 111 to obtain the positive electrode sheet 110. In the embodiment, the positive base 111 is formed of an aluminum foil or an aluminum-alloy foil. The positive base 111 is a base for aggregating the positive composite material layers 112 and is also a current collecting member that collects electricity from the positive composite material layers 112.

In the positive electrode sheet 110, the positive composite material layers 112 are formed on surfaces of the positive base 111. The positive composite material layers 112 include a positive active material. The positive active material is a material capable of storing and releasing lithium and is, for example, lithium cobalt oxide ($LiCoO_2$), lithium manganese oxide ($LiMn_2O_4$), or lithium nickel oxide ($LiNiO_2$). Further, $LiCoO_2$, $LiMn_2O_4$, and $LiNiO_2$ may be mixed in any proportion.

The positive composite material layers 112 include a conductive material. Examples of the conductive material include acetylene black (AB), carbon black such as Ketjenblack (registered trademark), and graphite.

The positive electrode sheet 110 is formed by, for example, mixing the positive active material, the conductive member, solvent, and binder, applying the mixed positive composite material to the positive base 111, and drying the positive composite material.

Separator 120

The separator 120 is a non-woven cloth of polypropylene, which is a porous resin, or the like that retains the nonaqueous electrolyte 17 between the negative electrode sheet 100 and the positive electrode sheet 110. As the separator 120, a porous polymer film such as a porous polyethylene film, a porous polyolefin film, or a porous polyvinyl chloride film and a lithium-ion-conductive or ion-conductive polymer electrolyte membrane may be used alone or in combination. When the electrode body 10 is immersed into the nonaqueous electrolyte 17, the nonaqueous electrolyte permeates the separator 120 from the ends toward the center.

Mechanical Property of Separator 120

The entirety of the separator 120 has a porous structure. The mechanical structure of the separator 120 has a relatively thick framework and a relatively thin three-dimensional mesh portion formed on the framework. In the rolled body pressing step (S4), when the separator 120 is compressed, since the resin of the separator 120 is elastic, the separator 120 is elastically deformed so that void portions in the separator 120 are squashed. At this time, the relatively thin three-dimensional mesh portion, which is formed in the relatively thick framework, deforms more greatly than the framework even when receiving the same force. When the compressed state is shifted to an uncontrolled state in which no pressure is applied, the thickness of the entire separator 120 is restored almost completely due to its resilience. The relatively thin three-dimensional mesh portion, which has been deformed more greatly, has a plastically deformed portion that is deformed beyond the yield point. In contrast, the relatively thick framework is less likely to be plastically deformed and is restored to the original shape almost completely by its resilience. When compressed in this manner, the separator 120 is hardened and the spring constant is increased.

Temperature-Dependent Plastic Deformation of Separator 120

The separator 120 is relatively less likely to plastically deform at a normal temperature (10° C. to 35° C.). The separator 120 is relatively more likely to deform at a high temperature (temperature being higher than 35° C.).

The normal temperature may be determined based on the temperature of a working environment. Alternatively, the normal temperature may be determined based on changes in the temperature caused by heat generation or heat emission of the battery. Further, the normal temperature may be determined based on changes in the temperature caused by external heating or cooling. That is, the normal temperature may be determined in any manner as long as whether the separator 120 is more or less likely to plastically deform is determined.

Changes in Spring Constant of Separator 120 by Compression

In this description, "restraining" refers to directly or indirectly applying pressure to the electrode body 10 in the thickness-wise direction D to compress the separator 120. The electrode body 10 may be directly sandwiched and compressed by a pressing machine or the like. Alternatively, after the electrode body 10 is accommodated in the battery case 11, the battery case 11 may be pressed in the thickness-wise direction D to compress the electrode body 10. Further, when cell batteries are stacked, the battery case 11 may be pressed in the thickness-wise direction D. Instead of using the pressing units 2, the pressing may be performed using a restraining frame with a thread-fastening structure.

When the electrode body 10 is compressed at a high temperature, the softened separator 120 is compressed, plastically deformed so that the void portions are squashed, and hardened. That is, the spring constant is increased.

When the electrode body 10 is compressed at a normal temperature, the non-softened separator 120 is compressed, plastically deformed so that the void portions are squashed, and hardened. However, the degree of plastic deformation at a normal temperature is less than that at a high temperature. That is, the spring constant is increased by a smaller degree.

Spring Constant H and Spring Constant L

The inventors obtained the hardness of the electrode body 10 (rechargeable battery) when bulged and the hardness of the electrode body 10 (rechargeable battery) when contracted based on the spring constant H, which is the spring constant of the rechargeable battery with 316 to 210 $N/cm^2$, and the spring constant L, which is the spring constant of the rechargeable battery with 95 to 74 $N/cm^2$. In an example, the spring constant H is a spring constant of the rechargeable battery when a load of 316 to 210 $N/cm^2$ is applied to the rechargeable battery in the thickness-wise direction D, and the spring constant L is a spring constant of the rechargeable battery when a load of 95 to 74 $N/cm^2$ is applied to the rechargeable battery in the thickness-wise direction D. In this case, the measurement of the spring constant H and the spring constant L indirectly measures the hardness of the electrode body 10 when bulged and the hardness of the electrode body 10 when contracted.

The spring constant may be measured at a normal temperature (10° C. to 35° C.) by applying a specified pressure via the battery case 11 to a portion of the rechargeable battery corresponding to the electrode body 10.

The spring constant H indicates a behavior when a large force is applied. More specifically, the behavior corresponds to the electrode body 10 that is bulged when a high load is applied at a high SOC. In this state, the spring constant H is decreased, that is, the electrode body 10 is softened to absorb changes in the volume, thereby avoiding the discharging of the electrolyte when bulged. Thus, the electrolyte maintains a high retainability when the SOC is high.

The spring constant L indicates a behavior when a small force is applied. More specifically, the behavior corresponds to the electrode body 10 that is contracted when a low load is applied at a low SOC. In this state, the spring constant L is increased. That is, the electrode body 10 is hardened to limit changes in the volume, thereby avoiding the discharging of the electrolyte when contracted. Thus, the electrolyte also maintains a high retainability when the SOC is low.

Setting Ratio L/H of Spring Constant L to Spring Constant H

When the electrode body 10 is directly or indirectly restrained at a high temperature, the spring constant H (spring constant of the separator 120 with a high load) and the spring constant L (spring constant of the separator 120 with a low load) are both increased.

When the electrode body 10 is directly or indirectly restrained at a normal temperature, the spring constant H (spring constant of the separator 120 with a high load) is not likely to be changed, whereas only the spring constant L (spring constant of the separator 120 with a low load) is increased. That is, the values of the spring constant H and the spring constant L become closer to each other.

The ratio of the spring constant L to the spring constant H is referred to as the ratio L/H.

The inventors have found that the ratio L/H is relevant for maintaining a high electrolyte retainability in both a high SOC state and a low SOC state.

When the spring constant ratio (L/H) is too small, for example, the spring constant H is large relative to the spring constant L. In another example, the spring constant L is small relative to the spring constant H. In this case, when the electrode body 10 bulges and contracts, the retainability may deteriorate, and the salt concentration may become uneven.

When the spring constant ratio L/H is too large, for example, the spring constant H is small relative to the spring constant L. In another example, the spring constant L is large relative to the spring constant L. In this case, when the electrode body 10 is bulged, the amount of the retained electrolyte may become excessive, which advances the unevenness of the salt concentration. In addition, the electrode body 10 may become so hard that the flowing in and out of the electrolyte is hindered and the salt concentration may become uneven.

In the present embodiment, as described below, the ratio L/H of the spring constant L to the spring constant H is set to be greater than or equal to 0.34 and less than or equal to 0.41.

Adjustment of Spring Constant H and Spring Constant L

The relatively thin three-dimensional mesh portion, which is present in the porous separator 120 before the rolled body pressing step (S4), is deformed beyond the yield point and results in plastic deformation in the rolled body pressing step (S4). The diameter of each void portion is decreased from that before the rolled body pressing step (S4). That is, the spring constant of the separator 120 differs between before and after the rolled body pressing step (S4). As described above, the entire dimension of the separator 120 subtly differs between before and after the rolled body pressing step (S4) due to the resilience of the framework. However, even though the entire dimension is restored, the spring constant is increased by an amount corresponding to the squashed and diminished void portions. The rolled body pressing step (S4) is executed at a normal temperature, at which plastic deformation is relatively less likely to occur. Thus, the separator 120 maintains the softness.

A cell drying step (S8) and an aging step (S11) are executed at a high temperature. Therefore, if the cell battery is restrained in these steps, that is, if the electrode body 10 is indirectly restrained, the softened separator 120 plastically deforms greatly. The spring constant H (spring constant of the electrode body 10 with a high load) and the spring constant L (spring constant of the electrode body 10 with a low load) are both increased greatly.

An initial charging step (S10), a self-discharge inspection step (S12), and a shipping inspection step (S13) are executed at a normal temperature. Therefore, even when the cell battery or the battery stack is restrained in these steps, that is, even when the electrode body 10 is indirectly restrained, plastic deformation of the separator 120 is subtle, and only the spring constant L (spring constant of the electrode body 10 with a low load) is increased.

Thus, adjustment of only the spring constant L is achieved by "the restraining" "at a normal temperature". This allows for adjustment of the ratio L/H of the spring constant L to the spring constant H to a set value.

Nonaqueous Electrolyte 17

A nonaqueous electrolyte is a composition in which a nonaqueous solvent contains a supporting salt. For example, ethylene carbonate (EC) may be used as the nonaqueous solvent. Alternatively, the nonaqueous solvent may be one or more materials selected from a group of propylene carbonate (PC), diethyl carbonate (DEC), dimethyl carbonate (DMC), ethyl methyl carbonate (EMC), and the like. The supporting salt may be, for example, $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, or LiI. Moreover, the supporting salt may be one or more types of lithium compound (lithium salt) selected from the above compounds.

Steps for Manufacturing Lithium-Ion Rechargeable Battery 1

Figure 5:
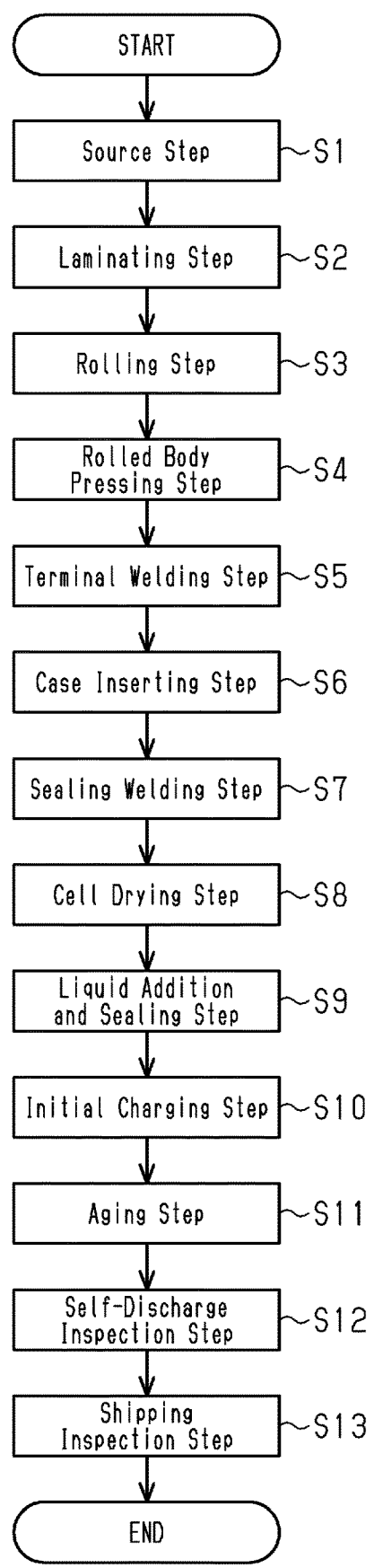
FIG. 5 is a flowchart showing steps for manufacturing the lithium-ion rechargeable battery of the present embodiment.

FIG. 5 is a flowchart showing steps for manufacturing the lithium-ion rechargeable battery 1 in the present embodiment. The overview of the manufacturing steps of the lithium-ion rechargeable battery 1 in the present embodiment will now be described with reference to FIG. 5.

Source Step (S1)

In the present embodiment, the source step (S1) is first executed. The source step refers to a step for producing battery elements of a lithium-ion rechargeable battery 1. More specifically, the step is for forming each of the negative electrode sheet 100, the positive electrode sheet 110, and the separator 120, which are included in the battery elements of the lithium-ion rechargeable battery 1.

Laminating Step (S2)

After the negative electrode sheet 100, the positive electrode sheet 110, and the separator 120 are formed in the source step (S1), the laminating step (S2) is executed.

As shown in FIG. 2, in the laminating step, the negative electrode sheet 100, the separator 120, the positive electrode sheet 110, and the separator 120 are laminated in order. The negative composite material layers 102 and the positive composite material layers 112 are disposed to be opposed to each other at opposite sides of the separator 120. The negative connector 103 is disposed to project from the separator 120 at one end in the width-wise direction W. The positive connector 113 is disposed to project from the separator 120 at the other end in the width-wise direction W.

Rolling Step (S3)

As shown in FIG. 2, the rolling step (S3) is executed on the electrode body 10 in which the negative electrode sheet 100, the separator 120, the positive electrode sheet 110, and the separator 120 are laminated in order in the laminating step (S2). In the rolling step (S3), the portions of the laminated electrode body 10 located on the center C-C are supported by a core and are rolled about a roll axis AX that extends in the width-wise direction W.

FIGS. 3 and 4 are diagrams showing the electrode body 10 upon completion of the rolling step (S3). As shown in FIG. 4, the rolled electrode body 10 includes the flat portion F, which is shaped as an athletic track, and the bent portions R, which are disposed at opposite ends of the flat portion F.

Rolled Body Pressing Step (S4)

FIG. 4 is a diagram showing the electrode body 10 during the rolled body pressing step (S4). As shown in FIG. 4, in the rolling step (S3), the electrode body 10 is rolled so that the flat portion F and the bent portions R, located at opposite ends of the flat portion F, are formed as viewed in the width-wise direction W. In the electrode body 10, the flat portion F is sandwiched and compressed in the thickness-wise direction D by the pressing units 2 with force that is less than or equal to 100 kN. The pressing units 2 include two pressing surfaces 2a that are flat and opposed to each other. When pressed by the pressing units 2 in the rolled body pressing step (S4), the electrode body 10 is substantially restored to its former shape by rebound resilience in a few seconds. However, the structure of the separator 120 is squashed and hardened, so that the spring constant is increased. At this time, the temperature is maintained at 25° C. to limit the softening of the resin and excessive squashing of the structure of the separator 120. The pressing time and pressing force are adjusted based on changes in the spring constant.

Terminal Welding Step (S5)

As shown in FIG. 2, in the electrode body 10 that is shaped in the rolled body pressing step (S4), the negative base 101 is exposed from one end to form the negative connector 103, and the positive base 111 is exposed from the other end to form the positive connector 113.

As shown in FIG. 3, in the terminal welding (S5), the negative current collector 13 is welded to the negative connector 103 and electrically and mechanically connected to the negative connector 103.

Also, as shown in FIG. 1, the positive current collector 15 is welded to the positive connector 113 and electrically and mechanically connected to the positive connector 113.

Case Inserting Step (S6)

As shown in FIG. 1, in the step of the case insertion (S6), the electrode body 10, which is rolled and has a low profile, and the positive current collector 15 and the negative current collector 13, which are welded to the electrode body 10, are inserted into the battery case 11.

Sealing Welding Step (S7)

In the step of the case welding (S7), the battery case 11 is sealed with the lid 12 by laser beam welding or the like. At this stage, the nonaqueous electrolyte is not added, and the liquid inlet of the lid 12 is open.

Cell Drying Step (S8)

In the step of the cell dry (S8), the temperature of the battery is increased to, for example, approximately 105° C. so that moisture and the like present in the battery case is sufficiently dried. In this step, the resin of the separator 120 is softened due to a high temperature. Hence, the restraining is not performed.

Liquid Addition and Sealing Step (S9)

In the step of the liquid addition and sealing (S9), the nonaqueous electrolyte 17 is added from the liquid inlet into the dry battery container. When the liquid addition is completed, the liquid inlet is sealed. This completes the assembly of the cell battery.

Initial Charging Step (S10)

When the assembly of the cell battery is completed, the initial charging step (S10) is executed. The initial charging is performed, for example, to form a solid electrolyte interphase (SEI) coating. The initial charging is performed at a relatively low charge rate. This limits increases in the temperature of the battery. In the present embodiment, the initial charging is performed, for example, at approximately 25° C. In this state, the resin that forms the separator 120 is not softened. In the initial charging step (S10), the cell battery is restrained. The restraining is performed with 10 kN or less. The restraining is performed until the initial charging step (S10) is completed. The pressure and the time are adjusted in view of the spring constant L.

Aging Step (S11)

When the initial charging step (S10) is completed, the aging step (S11) is executed. In the aging step (S11), the cell battery is chemically stabilized and activated. When a metal particle is present in the electrodes and forms a micro-short circuit between the electrodes, one of the purposes of the aging step is to apply current to the metal to obtain a high temperature to melt the metal and eliminate the micro-short circuit. The aging step (S11) is executed at a high temperature. For example, in the present embodiment, the temperature is maintained at approximately 60° C. Since the resin forming the separator 120 is softened at a high temperature, in process A of the present embodiment, in the aging step (S11), the restraining is not performed to avoid an excessive increase in the spring constant.

Self-Discharge Inspection Step (S12)

The self-discharge inspection step (S12) measures an open-circuit voltage OCV of the lithium-ion rechargeable battery 1 that has been fully charged to 100% of SOC in the initial charging step (S10) and then left at a high temperature in the aging step (S11). The degree of decreases in the voltage is examined to determine whether an excessive self-discharge has occurred. This measuring step is consecutively executed with the aging step (S11) but is executed after a certain time has elapsed from the aging step (S11). Hence, the self-discharge inspection step (S12) is executed when the temperature of the battery is a normal temperature, for example, approximately 20° C.

Shipping Inspection Step (S13)

The shipping inspection step (S12) executes inspections of, for example, external appearance, liquid leakage, cell voltage, and battery internal resistance. When the battery demonstrates predetermined properties, the battery is served as a product. The shipping inspection step (S12) is executed at a normal temperature, for example, 20° C. When lithium-ion rechargeable batteries 1 for vehicle on-board use have completed the inspections, the lithium-ion rechargeable batteries 1 are stacked to form a battery stack. At this time, the battery stack is restrained with pressure of 200 to 10000 N, preferably, 3000 to 6000 N. Any of the upper limits and the lower limits described above may be combined to define a range.

A plurality of battery stacks is accommodated in a container and provided with a controller and various sensors to form a battery pack for use with a vehicle.

Examples

Figure 6:
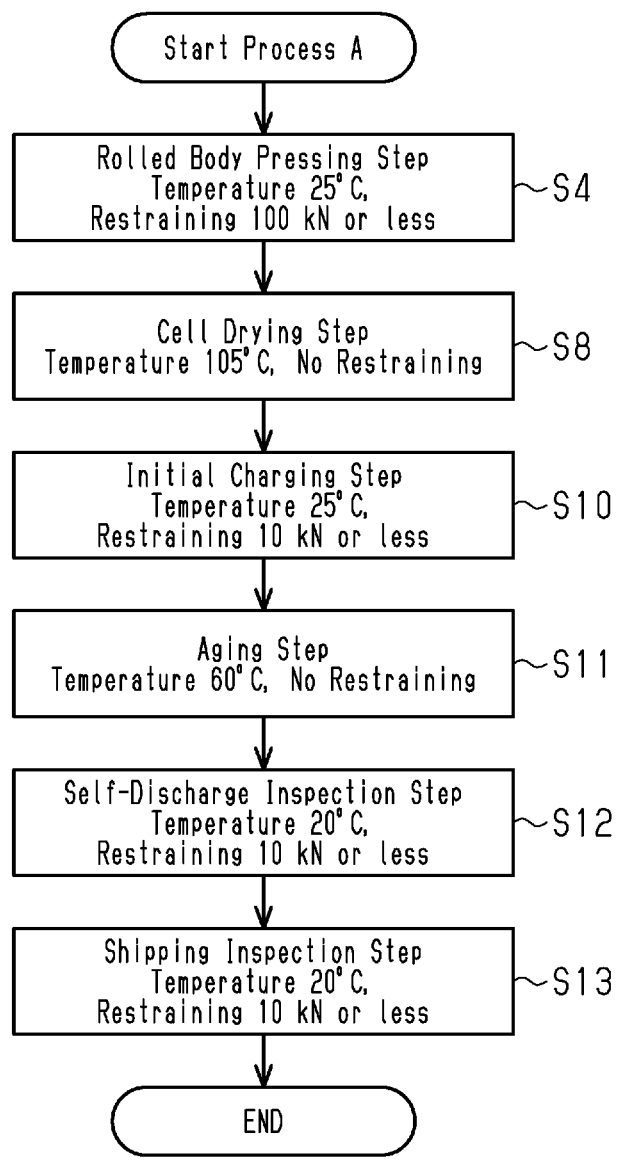
FIG. 6 is a flowchart showing a process A for adjusting a spring constant in the present embodiment.

FIG. 6 is a flowchart showing the process A of the present embodiment for adjusting the spring constant and processes B and C in comparative examples. The process A is a combination of conditions of the steps related to the spring constant in the steps S1 to S13 for manufacturing the lithium-ion rechargeable battery 1.

FIG. 7 is a table showing the conditions of the process A, the process B, and the process C.

Condition of Rolled Body Pressing Step

In the rolled body pressing step (S4), the flat portion F of the electrode body 10 is sandwiched and compressed in the thickness-wise direction D by the pressing units 2 with force that is less than or equal to 100 kN. The pressing units 2 include two pressing surfaces 2a that are flat and opposed to each other. The "compression" in this step is different from the "restraining" of the present embodiment. The pressing in this step refers to the compressing of the electrode body 10 with a force that is less than or equal to 100 kN but greater than the "restraining" force at a normal temperature of 25° C.

As a result, the porous structure of the separator 120 is squashed, and a portion of the separator 120 is plastically deformed. This increases the spring constant H (the spring constant of the separator 120 with a high load). Since the rolled body pressing step (S4) is executed at a normal temperature of approximately 25° C., plastic deformation is limited. This condition is common to the processes A, B, and C.

Condition of Cell Drying Step

In the cell drying step (S8), the temperature is set to a high temperature of 105° C. In this step, the cell battery is not restrained. If the cell battery is restrained at such a high temperature, the material of the separator 120 is softened and is prone to plastic deformation. As a result, the separator 120 is squashed, and the spring constant is quickly increased. This condition is also common to the processes A, B, and C.

Condition of Initial Charging Step

In the initial charging step (S10), the charging is slowly performed at a relatively low charge rate. This generates a small amount of heat. In the present embodiment, the initial charging step (S10) is executed at a temperature of approximately 25° C. Since this step is executed in a range of normal temperatures, the restraining is performed with a load of 10 kN or less. The restraining with a low load at a normal temperature has the effect of increasing only the spring constant L.

This condition is common to the processes A, B, and C.

Condition of Aging Step

In the aging step (S11), the battery is heated to melt metal particles. In the process A, the temperature of the battery is maintained at a high temperature of 60° C. In the process A, the temperature of the separator 120 is high, and the separator 120 is prone to plastic deformation. Therefore, the restraining is not performed to avoid a quick increase of the spring constant. In the process B, the restraining is not performed. In the process C, the restraining is performed. Thus, in the process C, the spring constant is increased. In particular, the spring constant H is greatly increased.

Condition of Self-Discharge Inspection Step

In the self-discharge inspection step (S12), the cell battery is restrained with a load of 10 kN or less at a normal temperature of 20° C. for a fixed amount of time after completion of the aging step (S11). The restraining is performed until the end of the inspection. In the process A, only the spring constant L is increased to reduce the difference from the spring constant H, thereby decreasing the ratio L/H.

The condition applies to only the process A. In the process B and the process C, the restraining is not performed, so that the condition differs between the process A and the processes B and C. In particular, in the process B, the restraining is performed only in the initial charging step (S10). Thus, the separator 120 is soft, and the spring constant H and the spring constant L are both low.

Condition of Shipping Inspection Step

The shipping inspection step (S13) executes inspections of, for example, external appearance, liquid leakage, cell voltage, and battery internal resistance. In this step, there is no need for heating, and there is no heat generation. In the process A, the battery stack is restrained with a load of 10 kN or less at a normal temperature of 20° C. until the inspection is completed. Thus, only the spring constant L is increased.

The condition applies to only the process A. In the process B and the process C, the electrode body is not restrained directly or indirectly, so that the condition differs between the process A and the processes B and C. In particular, in the process B, the restraining is performed only in the initial charging step (S10). Thus, the separator 120 is soft, and the spring constant H and the spring constant L are both low.

Examples

High-Rate Deterioration Test

In the present embodiment, the present disclosure was verified based on examples 1 to 8 and comparative examples 1 and 2. In examples 1 to 8, the process A was executed to manufacture lithium-ion rechargeable batteries 1 under different conditions. In comparative example 1, the process B was executed to manufacture a lithium-ion rechargeable battery 1. In comparative example 2, the process C was executed to manufacture a lithium-ion rechargeable battery 1. A square wave test is conducted on each of the lithium-ion rechargeable batteries 1 to determine the degree of high-rate deterioration.

Square Wave Test

FIG. 8 is a graph showing the square wave test for testing the high-rate deterioration of the lithium-ion rechargeable battery 1 of the present embodiment.

The square wave test repeats application of a current of a few dozen to a few hundred amperes for a few to a few dozen seconds and application of approximately one-tenth of the current in the opposite direction by the same amount. Such repetition of the high-rate charging and discharging causes the high-rate deterioration.

In the present embodiment, when the battery temperature is 25° C., the lithium-ion rechargeable battery 1 is charged at 100 A for ten seconds and then discharged at 10 A for one hundred seconds. More specifically, the current is set to 0 A for five seconds from the start. When five seconds have elapsed, the current is increased from 0 A to 100 A to charge the lithium-ion rechargeable battery 1. When fifteen seconds have elapsed, the current is changed from 100 A to 0 A to end the charging. When twenty seconds have elapsed, the current is changed from 0 A to −10 A to discharge the lithium-ion rechargeable battery 1 for one hundred seconds. When 120 seconds have elapsed, the current is changed from −10 A to 0 A. When 125 seconds have elapsed, one cycle is completed. The cycle was repeated one thousand times.

The internal resistance [Ω] of the cell was measured before the test and after the one thousand cycles to calculate an increase rate.

Restraining Condition

The restraining load on the electrode body 10 was directly or indirectly measured with Precision Universal Tester Autograph (registered trademark of Shimadzu Corporation). In the present embodiment, the restraining load is 4500 N.

High-Rate Deterioration Test Result

Figures 9, 10:
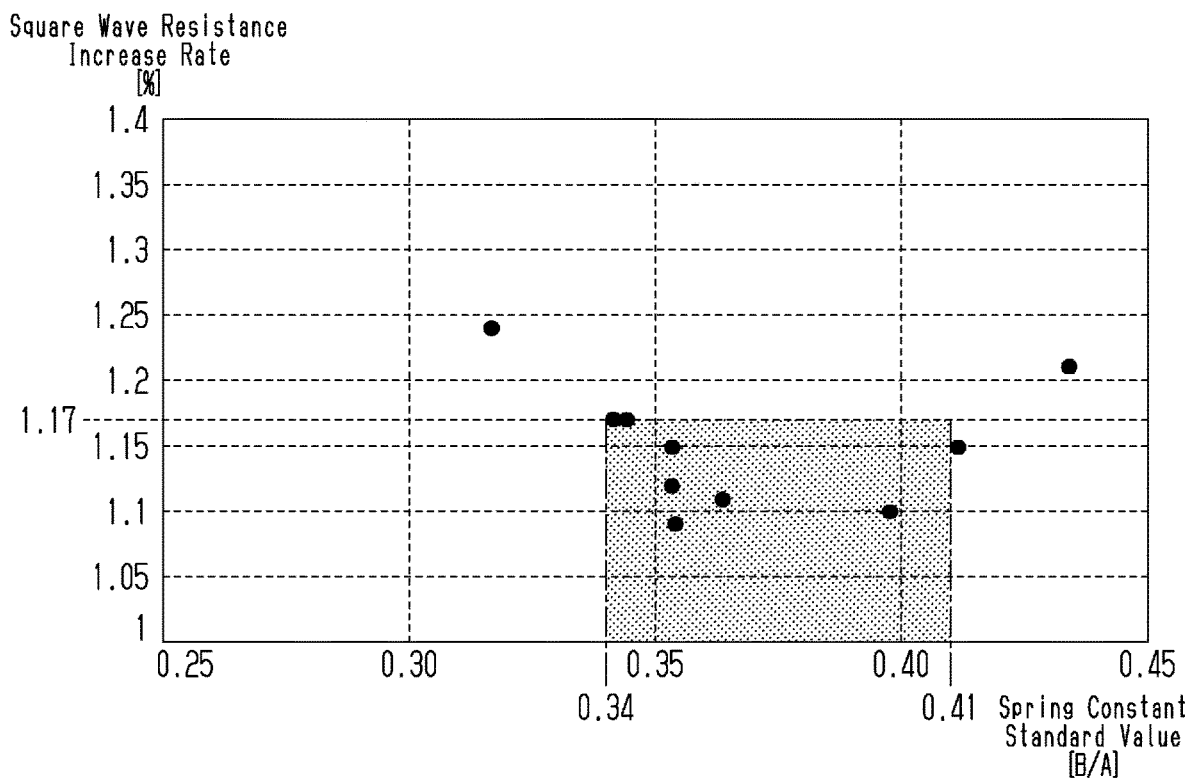
FIG. 9 is a table showing test results of the examples of the present embodiment and the comparative examples.
FIG. 10 is a graph showing test results of the examples of the present embodiment and the comparative examples.

FIG. 9 is a table showing the test results of the examples of the present embodiment and the comparative examples. FIG. 10 is a graph showing the test results of the examples of the present embodiment and the comparative examples.

Process A

Examples 1 to 8 show results of measurement of a resistance increase rate of lithium-ion rechargeable batteries 1 that were manufactured through the process A under conditions that differ in the number of rolls, the composition of composite material layers, and the like.

The results show that the spring constant H is in a range of 164 to 239 and the spring constant L is in a range of 58 to 90. The ratio L/H of the spring constant L to the spring constant H is in a range of 0.34 to 0.41. That is, the restraining conditions (e.g., temperature, load, and time of restraining) are set so that the ratio L/H of the spring constant L to the spring constant H is in the range of 0.34 to 0.41. The resistance increase rate (increase rate of the internal resistance [Ω] between before and after the square wave test) is in a range of 1.09 to 1.17.

Process B

Comparative example 1 shows a result of measurement of the resistance increase rate of the lithium-ion rechargeable battery 1 that was manufactured through the process B. In the process B, the restraining is performed only in the initial charging step (S10). Thus, the separator 120 is soft, and the spring constant H and the spring constant L are both low.

The spring constant H is 183. The spring constant L is 58. The ratio L/H of the spring constant L to the spring constant H is 0.32. The resistance increase rate is high and is 1.24.

Process C

Comparative example 2 shows a result of measurement of the resistance increase rate of the lithium-ion rechargeable battery 1 that was manufactured through the process C. In the process C, the restraining is performed in the aging step (S11) in which the temperature is high. Thus, in the process C, the separator 120 is softened due to the high temperature, and the porous structure is squashed and plastically deformed. This increases the spring constants. In particular, the spring constant H is greatly increased.

The resultant spring constant H is 238 and is extremely high. The spring constant L is 102 and is high. The ratio L/H of the spring constant L to the spring constant H is 0.42. The resistance increase rate is high and is 1.21.

Conclusion of the Test

It is concluded from the results that the resistance increase rates of the lithium-ion rechargeable batteries 1 manufactured through the process A are limited to 1.09 to 1.17. Comparative example 1 in which the lithium-ion rechargeable battery 1 was manufactured through the process B and comparative example 2 in the lithium-ion rechargeable battery 1 was manufactured through the process C show that the resistance increase rates are 1.21 to 1.24 and are high. This verifies that the lithium-ion rechargeable batteries 1 that are manufactured through the process A significantly limits the high-rate deterioration as compared to the lithium-ion rechargeable batteries 1 that are manufactured through the processes B and C.

In other words, when the ratio L/H of the spring constant L to the spring constant H is in the range of 0.34 to 0.41, the resistance increase rate is limited to 1.09 to 1.17. Thus, limitation of the resistance increase rate is achieved by controlling the ratio of the spring constant L to the spring constant H.

Operation of Present Embodiment

The high-rate deterioration occurs in the low-profile rolled type electrode body 10 when the charging and discharging are repeated at a high rate, and active material layers bulge and contract in accordance with the charging and discharging. The pressure of the electrode body 10 increases and decreases, accordingly. This may cause distribution (unevenness) of concentration of supporting salt and leakage of a nonaqueous electrolyte 17 to the outside of the electrode body 10, which may result in the depletion of the electrolyte. Consequently, the internal resistance of the lithium-ion rechargeable battery 1 may increase. This leads to deterioration in the properties of the lithium-ion rechargeable battery 1.

In the present embodiment, the spring constant H and the spring constant L are used to obtain the hardness of the electrode body 10 when bulged and the hardness of the electrode body 10 when contracted.

The inventors have found that in such a usage environment, when the ratio L/H of the spring constant L to the spring constant H is greater than or equal to 0.34 and less than or equal to 0.41, the ratio has a good balance and the high-rate deterioration is limited.

The inventors also have found that the spring constant L with a low load is uniquely increased when the electrode body 10 is directly or indirectly restrained only in a normal-temperature process. The inventors have found, using this property, a manufacturing method that sets the ratio L/H of the spring constant L to the spring constant H to be greater than or equal to 0.34 and less than or equal to 0.41.

The lithium-ion rechargeable battery 1 of the present embodiment limits increases and decreases in the pressure of the electrode body 10, thereby limiting the distribution (unevenness) of concentration of supporting salt and the leakage of the nonaqueous electrolyte 17 to the outside of the electrode body 10, which may result in the depletion of the electrolyte.

More specifically, the electrode body 10 is bulged when a high load is applied at a high state of charge (SOC). In this state, the electrode body 10 is softened to absorb changes in the volume, thereby avoiding the discharging of the non-aqueous electrolyte 17 when bulged. Thus, the nonaqueous electrolyte 17 maintains a high retainability when the SOC is high.

When a low load is applied at a low SOC, the electrode body 10 is contracted. In this state, the electrode body 10 is hardened to limit changes in the volume, thereby avoiding the discharging of the nonaqueous electrolyte 17 when contracted. Thus, the nonaqueous electrolyte 17 also maintains a high retainability when the SOC is low.

The lithium-ion rechargeable battery 1 has both of the properties described above, so that the high-rate deterioration is limited.

Effects of Present Embodiment (1) The lithium-ion rechargeable battery 1 and the method for manufacturing the lithium-ion rechargeable battery 1 according to the present embodiment limit deterioration even when used in a mode that repeats charging and discharging at a high rate without complicating the electrode body 10.

(2) The unevenness of salt concentration is reduced using only the electrode body 10. The spring constants are controlled in the normal process. Thus, the high-rate deterioration is effectively limited without the need for special equipment and increases in the cost.

(3) The lithium-ion rechargeable battery 1 of the present embodiment mitigates risks such as shortening the voltage withstanding life caused by damages to the battery case 11 and lithium deposition caused by a local electrochemical reaction without the need for a special structure.

(4) The method for manufacturing the lithium-ion rechargeable battery 1 of the present embodiment may be implemented by performing only the restraining under a predetermined condition. Therefore, the method is applicable to the manufacturing of a conventional lithium-ion rechargeable battery 1 using an existing manufacturing facility.

Modified Examples

In the present embodiment, the present disclosure is described using the lithium-ion rechargeable battery 1 as an example. However, the present disclosure is applicable to other nonaqueous electrolyte rechargeable batteries.

In the present embodiment, the lithium-ion rechargeable battery 1 is flat and slim and is for a vehicle on-board use. The present disclosure is also applicable to a cylindrical battery or the like. Further, the present disclosure is applicable to a battery for the use with a ship or an aircraft and a stationary battery in addition to a vehicle on-board battery.

The temperature, the load, and the time of restraining in the process A are examples of the restraining conditions. A person skilled in the art may optimize the temperature, the load, and the time of restraining as the restraining conditions in accordance with the properties of the battery so that the high-rate deterioration is limited.

The flowcharts shown in FIGS. 5 and 6 are examples. One skilled in the art may add, remove, change, and reorder the steps in the flowchart and execute the steps.

The high-rate deterioration is checked by the square wave test. However, any means may be used as long as the high-rate deterioration is estimated.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A nonaqueous electrolyte rechargeable battery, comprising:
    an electrode body;
    a nonaqueous electrolyte; and
    a rectangular box-shaped battery case accommodating the electrode body and the nonaqueous electrolyte, wherein
    the electrode body includes a positive electrode including a positive base and a positive composite material layer, a negative electrode including a negative base and a negative composite material layer, and a porous resin separator disposed between the positive electrode and the negative electrode, the electrode body having a low profile when the positive electrode, the negative electrode, and the separator are laminated and rolled,
    when a spring constant of the nonaqueous electrolyte rechargeable battery with a load of 316 to 210 N/cm$^2$ is referred to as a spring constant H and a spring constant of the nonaqueous electrolyte rechargeable battery with a load of 95 to 74 N/cm$^2$ is referred to as a spring constant L, a ratio L/H of the spring constant L to the spring constant H is greater than or equal to 0.34 and less than or equal to 0.41.

2. The nonaqueous electrolyte rechargeable battery according to claim 1, wherein the nonaqueous electrolyte rechargeable battery is a lithium-ion rechargeable battery.

* * * * *